United States Patent [19]

Burton

[11] 4,021,690

[45] May 3, 1977

[54] WHEEL BORNE COUNTER ROTATING DISC ALTERNATOR

[76] Inventor: Frank Burton, 300 Mil-Mar, Lee's Summit, Mo. 64063

[22] Filed: May 30, 1975

[21] Appl. No.: 582,080

[52] U.S. Cl. .............................. 310/67 R; 310/83; 310/118

[51] Int. Cl.² .......................................... H02K 7/00

[58] Field of Search .......................... 310/168–170, 310/75, 75 C, 67, 76, 232, 77, 83, 42, 92, 93, 99, 268, 114, 115, 116, 118, 120, 121; 74/711; 320/2, 61; 180/10, 65 F; 290/45, 50

[56] References Cited

UNITED STATES PATENTS

| | | | |
|---|---|---|---|
| 2,506,780 | 5/1950 | De Salardi | 290/50 |
| 2,696,585 | 12/1954 | Vermillion | 310/118 |
| 3,161,249 | 12/1964 | Bouladon | 180/10 |
| 3,191,080 | 6/1965 | Edwards | 310/118 |
| 3,487,285 | 12/1969 | Edwards | 320/61 |
| 3,544,822 | 8/1968 | Pickles | 310/268 |
| 3,678,314 | 7/1972 | Carter | 310/268 |
| 3,693,745 | 9/1972 | Petrov | 310/67 |
| 3,704,759 | 12/1972 | Vitkov | 310/67 |
| 3,769,533 | 10/1973 | Pauwels | 310/168 |
| 3,792,742 | 2/1974 | Mager | 180/65 F |
| 3,812,928 | 5/1974 | Rockwell | 310/77 |
| 3,897,843 | 8/1975 | Hapeman | 310/67 |

FOREIGN PATENTS OR APPLICATIONS 104,443   5/1926   Austria .............................. 180/65 F Primary Examiner—R. Skudy
Attorney, Agent, or Firm—Berman, Aisenberg & Platt

[57] ABSTRACT

A motor vehicle alternator consisting of a stator assembly secured in a wheel which is journalled on an axle of the associated vehicle. Also rotatably arranged in the wheel concentrically within and in operative relation with the stator assembly is a field assembly, energized from the vehicle battery by means of a contact brush on the shaft engaging a slip ring on the rotary field assembly. The field assembly is gearingly driven by the wheel to rotate in the opposite direction with respect to the wheel, by means of radially journalled bevelled gears supported on the shaft and meshing with respective coaxial bevelled gears on the wheel and the field assembly. Output from the stator assembly is by means of respective brushes on the wheel and the shaft engaging opposite sides of a slip ring carried by the rotary field assembly. In a modified form, the field assembly is fixed relative to the shaft and the stator assembly is secured in the wheel and rotates around the field assembly.

6 Claims, 8 Drawing Figures

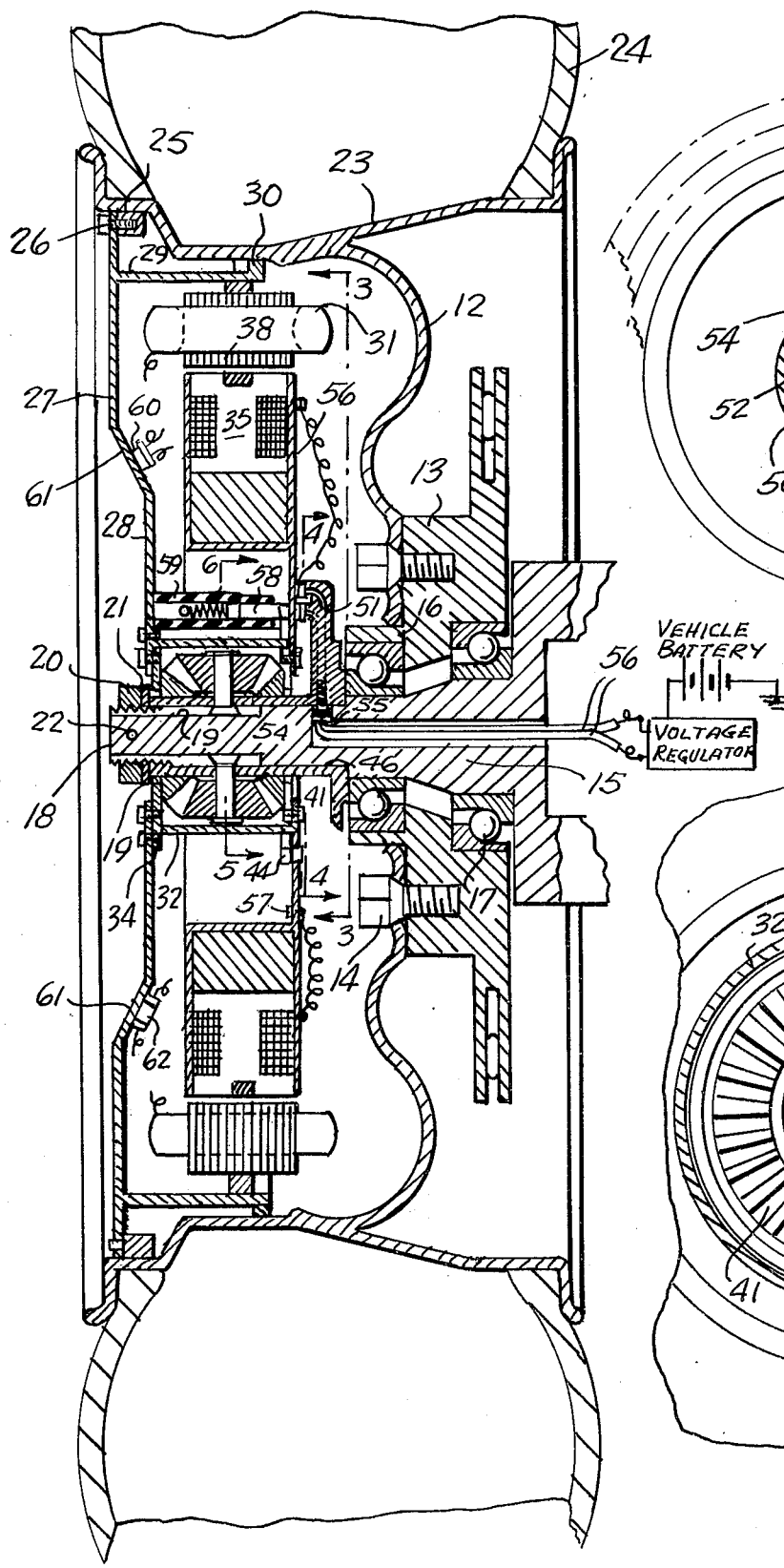

WHEEL BORNE COUNTER ROTATING DISC ALTERNATOR

This invention relates to electric power generating devices, and more particularly to a power generating device incorporated in a wheel of a motor vehicle for use in charging the motor vehicle battery as well as to act as a brake.

A main object of the invention is to provide a novel and improved motor vehicle wheel-driven electrical generator which is relatively simple in construction, which is very compact in size, and which is easy to install.

A further object of the invention is to provide an improved power generating device incorporated in the wheel of a motor vehicle, the device being in the form of an alternator and being provided with suitable rectification and filtering means so as to deliver a direct current output, said device being relatively simple in construction, involving a minimum number of parts, providing highly efficient generation of electrical energy, being relatively light in weight, and utilizing the frictional engagement of the associated wheel to provide its required driving torque.

A still further object of the invention is to provide an improved electrical power generating device which can be incorporated in a motor vehicle wheel without increasing the bulk of the wheel and without substantially impairing the balance characteristics of the wheel, the device further being provided with means to develop counter rotation of its field assembly relative to its stator assembly so as to produce a high relative speed of the stator assembly relative to the field assembly and to therefore substantially increase the operating efficiency of the device.

A still further object of the invention is to provide an improved electric power generating device which can be incorporated in a motor vehicle wheel and which is so arranged that it can be readily removed so as to facilitate the changing of the wheel tire or the substitution of another wheel.

Further objects and advantages of the invention will become apparent from the following description and claims, and from the accompanying drawings, wherein:

FIG. 2 is an enlarged fragmentary vertical cross-sectional view taken substantially on a line 2—2 of FIG. 1.

FIG. 4 is an enlarged fragmentary vertical cross-sectional view taken substantially on a line 4—4 of FIG. 2.

FIG. 5 is a fragmentary enlarged vertical cross-sectional view taken substantially on a line 5—5 of FIG. 2.

Figure 1:
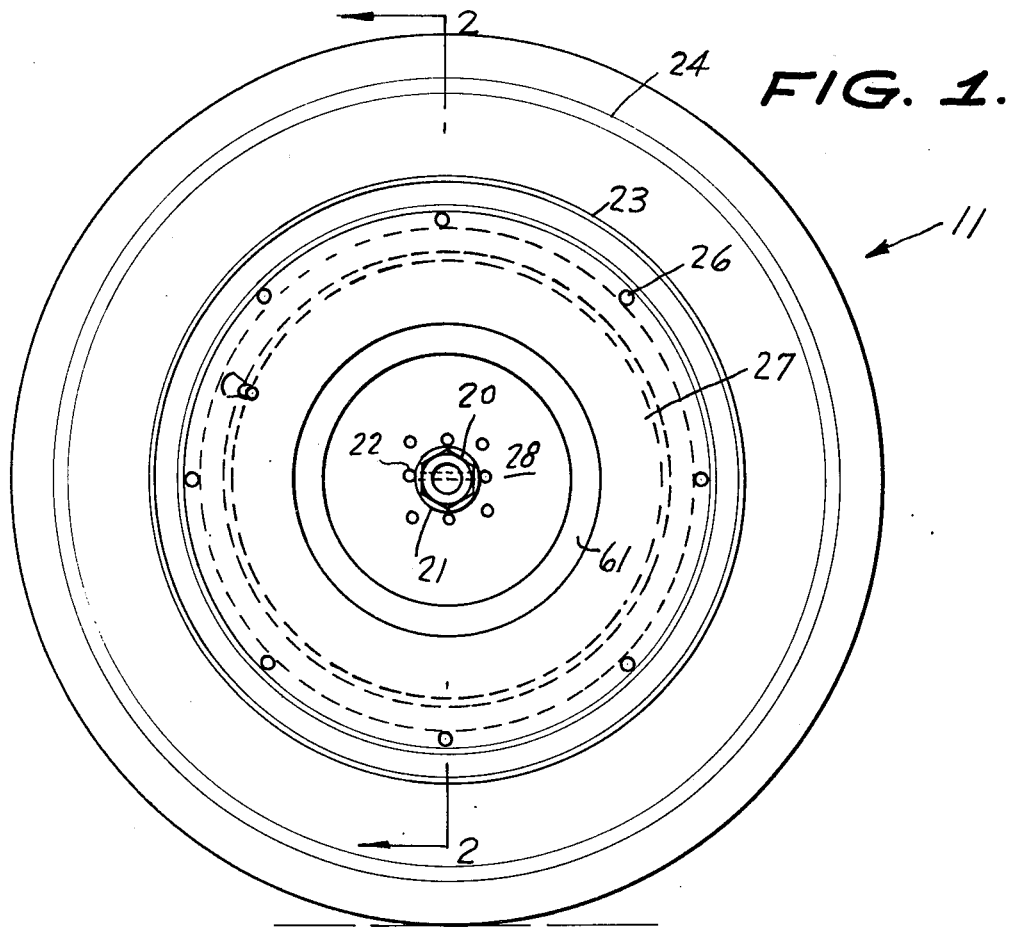
FIG. 1 is a side elevational view of a motor vehicle wheel provided with an electric power generating device in accordance with the present invention, shown fully assembled.
Figure 3:
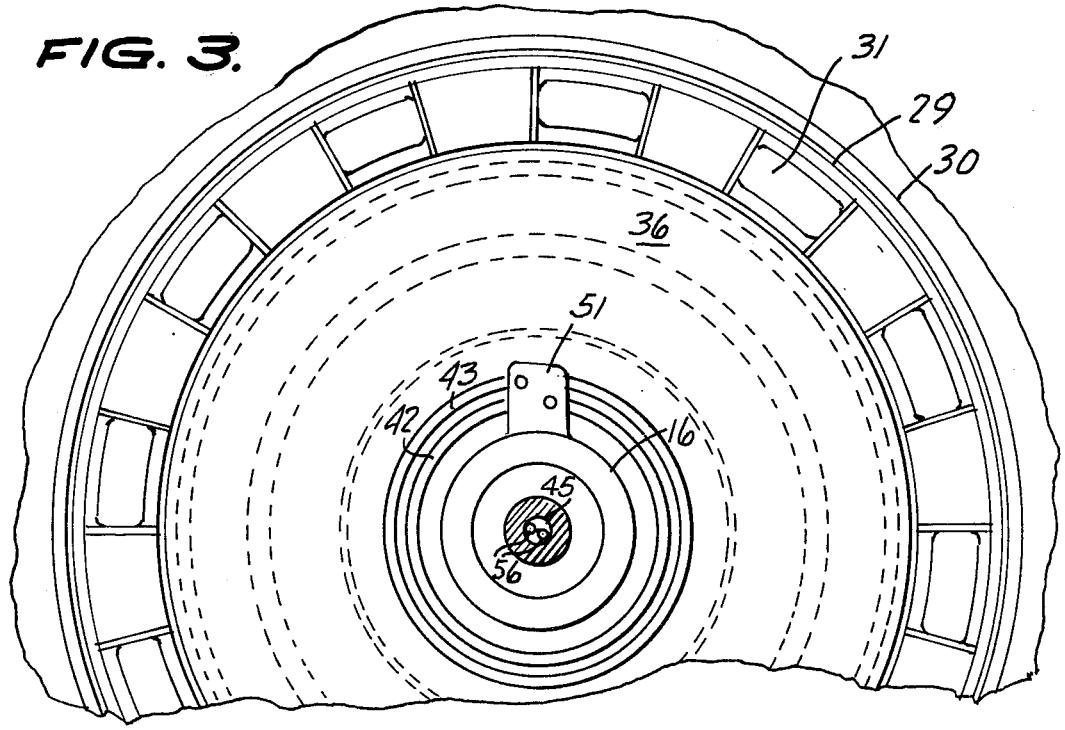
FIG. 3 is a fragmentary vertical cross-sectional view taken substantially on a line 3—3 of FIG. 2.

Referring to the drawings, 11 generally designates a motor vehicle wheel containing an improved electric power generating assembly, in accordance with the present invention, said wheel comprising a substantially circular main body 12 which is secured to a central hub portion 13 by a plurality of removable fastening bolts 14. The hub portion 13 is journalled on a vehicle axle 15 which is non-rotative relative to the vehicle frame, for example, which may form part of a conventional front wheel suspension assembly in the case of a vehicle having rear wheel drive. The hub portion 13 is journalled on the thickened inner portion of the axle 15 by means of suitable ball bearing assemblies 16 and 17.

It will be noted that the axle 15 has a relatively reduced outer end portion 18 which is provided with diametrically opposed keyways 19, 19 and which is externally threaded to receive a fastening nut 20 and which is adapted to receive a washer 21 against which the nut 20 is engageable. The nut may be locked in position by the provision of a removable cotter pin 22 engaged through the nut and through the shaft portion 18, as is clearly shown in FIGS. 1 and 2.

Secured on the periphery of the main body 12 is a conventional tire rim 23 grooved to receive a pneumatic tire 24.

Rigidly secured in the outer portion of rim 23, as by welding, or the like, is an anchoring ring 25, and detachably secured thereto, as by bolts 26 is a generally circular outer wall member 27 which has an inwardly offset central portion 28. Rigidly secured to the wall member 27 concentrically therewith adjacent its peripheral portion is an inwardly extending annular flange 29, and secured on the marginal portion of said flange 29 is a spacer ring 30 slidably received against the inside surface of rim 23.

Secured to the inside surface of the flange 29 at its inner portion is a conventional alternator stator assembly 31, the stator assembly 31 being secured to the inside surface of flange 29 in any suitable manner, whereby it is thus supportingly secured to the peripheral portion of wall member 27 by the annular flange 29.

Designated at 32 is a cup with an annular end wall 33 integrally formed with a bevelled gear 34. The wall member 33 is rigidly secured to the inner main wall portion 28 coaxially with the shaft portion 18.

Designated at 35 is an alternator field assembly which is arranged concentrically within the stator assembly 31, being mounted on a circular supporting plate member 36 provided with an annular outwardly facing housing 37 shaped to receive the field assembly 35. Field assembly 35 includes the outer shielding ring 38 exposed in the relatively narrow air gap between shield assembly 35 and stator assembly 31.

Figure 6:
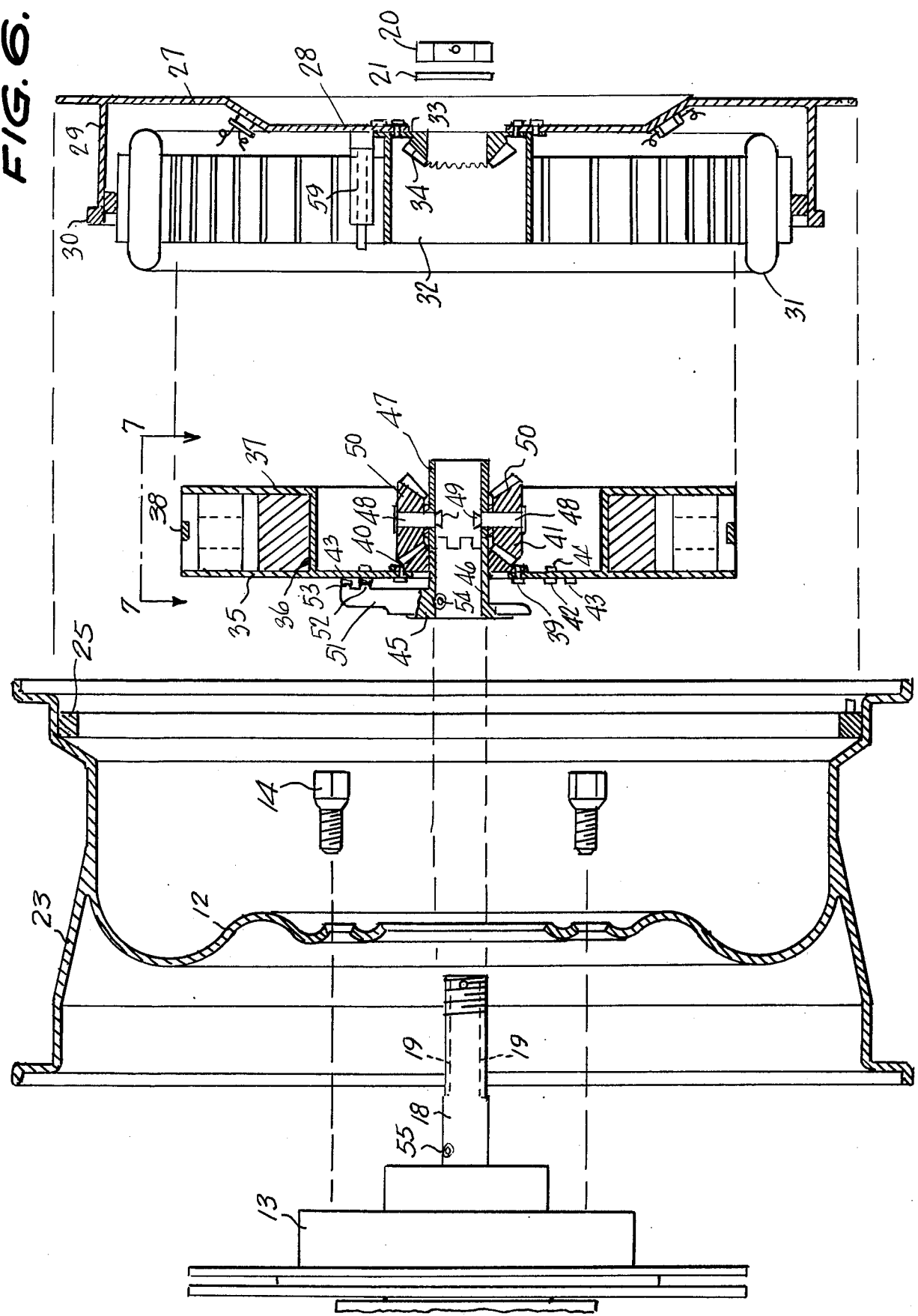
FIG. 6 is a vertical cross-sectional view of the assembly shown in FIG. 2 with the parts in separated positions.
Figure 7:
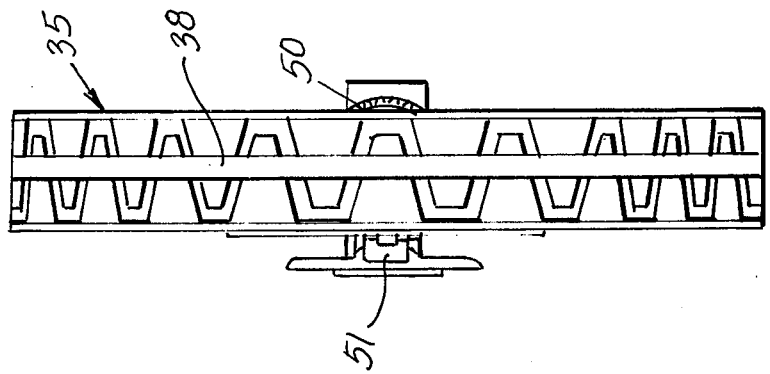
FIG. 7 is a top plan view taken substantially on a line 7—7 of FIG. 6.

The circular shield assembly supporting plate member 36 is formed with a central aperture 39, and rigidly secured around the margin of said central aperture is a washer plate 40 to which is rigidly secured a bevelled gear 41, as shown in FIG. 6. Bevelled gear 41 opposes the previously mentioned bevelled gear 34 carried by the inner portion 28 of main wall member 27.

The disc member 36 and the housing 37 integrally formed therewith are made of conductive material. Insulatingly secured on the outside surface of member 36, namely, the leftward surface thereof as viewed in FIG. 6, are a pair of slip rings 42 and 43 arranged concentrically of disc member 36, and insulatingly and concentrically secured on disc member 36 on its inner surface, namely, the rightward surface thereof as viewed in FIG. 5, is another slip ring 44 which is electrically connected to slip ring 42. Designated at 45 is a body of insulating material formed with a sleeve portion 46 which extends through the central aperture 39 concentrically therewith and which is splined to another sleeve member 47 aligned with the sleeve member 46 to receive shaft portion 18, as will be apparent from FIG. 6. A plurality of diametrically opposed outwardly extending shaft members 48, 48 are rigidly secured to the sleeve member 47 and have inwardly projecting dovetailed lug portions 49, 49 adapted to be slidably engaged in the shaft keyways 19, 19. Journalled on the shaft element 48, 48 are respective bevelled gears 50, 50 which meshingly engage the bevelled gears 41 and 34, with the parts in fully assembled positions, as shown in FIG. 2. Thus, sleeve members 46 and 47 including the body 45, are keyed to the shaft portion 18 and are held against the rotation relative thereto, whereas bevelled gears 50 are free to rotate. Therefore, rotation of the wheel and the wall member 27 causes bevel gear 34 to drive bevel gear 41 in an opposite direction through the idler bevel gears 50, 50.

The body 45 is formed with an integral brush post arm 51 carrying a pair of brushes 52 and 53 arranged to slidably engage on the respective slip rings 42 and 43. The brushes 52 and 53 are connected internally of post member 41 by suitable conductors to respective spring contact members 54 facing inwardly in the bore of sleeve member 46 and adapted to conductively engage respective stationary contact elements 55 insulatingly mounted on the rear portion (leftward portion as viewed in FIG. 6), of shaft element 18, the spring contact elements 54 being located to register with and engage the stationary contact elements 55 when the parts are assembled with the lug elements 49 received in the keyways 19 and the parts operatively secured together to form the assembly of FIG. 2. The contacts 55 are respectively connected by conductors 56 to the ungrounded terminal of the vehicle battery. Slip ring 43 is connected to the ungrounded terminal of the field assembly 35, whereby said field assembly is energized from the vehicle battery through brush element 53 and slip ring 43.

It will be understood that one terminal of the field assembly 35 is grounded in any suitable manner, for example, by being connected to the supporting disc 46 at 57. The field assembly is thus energized from the vehicle battery through the connections above described. The respective slip rings 42, 43 and 44, carried by the supporting disc 46 are provided with suitable insulating means so that they are electrically insulated from disc 36.

The inner slip ring 44 is slidably engaged by a contact brush 58 carried by a brush holder assembly 59 secured to the inwardly offset main wall portion 28. One terminal of the stator assembly 31 is grounded, and the other terminal thereof is connected in a conventional manner to the brush element 58 through a rectifier, such as a diode assembly or the like, shown at 60, mounted on the annular sloping main wall portion 61. Also mounted on said wall portion 61 is a conventional filter capacitor, or equivalent filtering assembly, shown at 62, connected in a manner to smooth the rectified current delivered to the output brush element 58. The rectified current is delivered to the ungrounded terminal of the vehicle battery through one of the contacts 55 and its associated battery wire 56.

In operation, rotation of the wheel 24 causes the stator assembly 31 to rotate around the axle portion 18, and this causes the field assembly 35 to rotate in the opposite direction, as above explained, by the action of the cooperating bevelled gears 34, 50 and 41. The counter rotation of the field assembly with respect to the stator assembly thus greatly increases the generated voltage as over that which would be obtained if the field assembly were held fixed relative to the shaft 16. This feature reduces the number of coils required in the stator assembly, as well as providing satisfactory battery charging action, even at relatively low speeds. As will be further apparent, this feature also greatly reduces the amount of copper required in the various windings of the alternator assembly.

If it becomes necessary to remove the assembly, for example, to change a wheel, it is merely necessary to unfasten the nut 20, which allows the wheel to be pulled off the axle, since the lug elements, 49, 49 are slidable in the axle keyways 19, 19. The electrical contact elements 55 and 54 are readily disengageable, to allow the assembly to be removed from the axle. Replacement of the assembly is accomplished by following a reverse procedure with the wheel in the proper orientation required to cause the contact elements 54 and 55 to reengage when the re-assembly is performed. After the parts have been thus re-assembled, the nut 20 and washer 21 are replaced on the shaft portion 18 and the nut 20 is then tightened to clamp the washer 21 against the rim of the sleeve element 47. With the nut suitably tightened, the cotter pin 22 can be reinserted to lock the assembly in operative condition. As will be readily understood, removal of the nut 20 and washer 21 and the rim fastening bolts 26 are required in order to remove the alternator parts from the wheel and provide access to the securing bolts 14, which must be unfastened in order to detach the wheel from the hub portion 13. In replacing the alternator components, after the hub has been secured to the wheel 13, the field assembly is first engaged on the shaft portion 18, after which wheel member 27, carrying the stator portion, is secured to the rim 25. The washer 21 and nut 20 are then mounted on the threaded end of shaft portion 18 in the manner above described, the nut being suitably tightened and then locked by means of the cotter pin 22.

Figure 8:
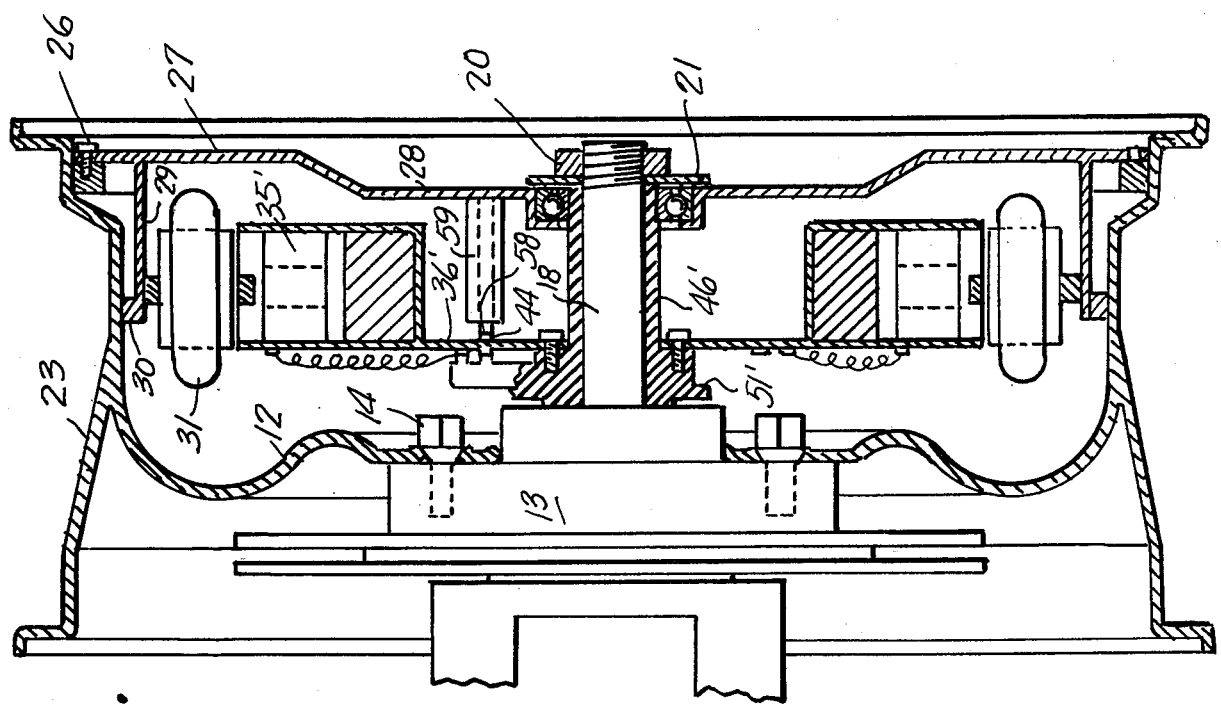
FIG. 8 is a vertical cross-sectional view, generally similar to FIG. 2, but showing a modified form of the electric power generating assembly of the present invention.

In the embodiment illustrated in FIG. 8, the field counter-rotational feature is omitted, and the alternator field assembly, shown at 35' has its main supporting disc 36' bolted to the body portion 51' of an insulating sleeve member 46' which receives the shaft portion 18. In this embodiment the insulating member 51' is slidably keyed in any suitable manner to the axle and therefore the field assembly 35' remains stationary while the stator assembly 31 rotates with the wheel rim 23. Thus, the field assembly is energized from the vehicle battery in the same manner as previously described, except that the field assembly does not counter-rotate relative to the stator and the voltage generated depends solely upon the rate of rotation of the stator assembly relative to the stationary field assembly.

As in the previously described embodiment of the invention, the alternator assembly may be readily removed, when access is desired to the wheel fastening bolts 14, by removing nut 20 and washer 21 and by removing the rim bolts 26, in the manner above described, to allow the alternator parts to be removed from the interior of the wheel.

While certain specific embodiments of a improved motor vehicle-mounted alternator assembly have been described in the foregoing description, it will be understood that various modifications within the sphere of the invention may occur to those skilled in the art. Therefore it is intended that no limitations be placed on the invention except as defined by the scope of the appended claims.

What is claimed is:

1. A wheel for use in a motor vehicle having an axle, comprising a substantially circular main body with a central hub portion for journalling on said axle, a rim peripherally secured on said main body and being shaped to receive a pneumatic tire, a generally circular outer wall member, means securing said wall member in the outer portion of said rim, said wall member being constructed to rotatably receive the axle through its central portion, an alternator stator assembly in said rim, means supportingly securing said stator assembly to the peripheral portion of the wall member, an alternator field assembly arranged concentrically in the stator assembly, means to support the field assembly on the axle, a field supply conductor, first circuit means connecting said field assembly to the field supply conductor, an output conductor, and second circuit means including a slip ring on said means to support the field assembly, contact brush means slidably engaging said slip ring and arranged to connect said stator assembly to said output conductor, and means for rotating said field assembly relative to the axle in a direction opposite to the direction of rotation of the stator assembly, said means for rotating said field assembly comprising first and second bevel gears secured to said means to support the field assembly and the outer wall member, a coupling bevel gear between and meshing with said first and second bevel gears, and journal shaft means rotatably supporting said coupling bevel gear on a fixed axis perpendicular to the axle.

2. The wheel of claim 1, and wherein the coupling gear is provided with a supporting shaft having a key for slidable insertion in a keyway on the axle.

3. The wheel of claim 2, and wherein said first and second circuit means includes respective pairs of separable contact elements which make conductive contact with each other when said means to support the field assembly is in a position wherein the field assembly is operatively received in and is in working alignment with the stator assembly.

4. The motor vehicle of claim 3, and wherein said first circuit means include a second slip ring on the field assembly support means and second contact brush means fixed relative to the axle and slidably engaging said second slip ring.

5. The wheel of claim 1, and wherein the means securing the stator assembly to the peripheral portion of the wall member comprises an inwardly extending annular flange on the wall member coaxial with the rim, and means securing the stator assembly to the inside marginal portion of said flange.

6. The wheel of claim 5, and wherein the means to support the field assembly on the axle comprises a disc member for surrounding the axle.

* * * * *